(12) United States Patent
Saitoh et al.

(10) Patent No.: US 6,570,490 B1
(45) Date of Patent: May 27, 2003

(54) CONTACTLESS IC CARD

(75) Inventors: Takeshi Saitoh, Tokyo (JP); Masaaki Shida, Hachioji (JP); Tomoaki Ishifuji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/079,272

(22) Filed: May 15, 1998

(30) Foreign Application Priority Data

May 19, 1997 (JP) .............................................. 9-128277

(51) Int. Cl.[7] ...................... G06K 19/067; G06K 19/07; G06K 19/077
(52) U.S. Cl. .................. 340/10.1; 340/10.34; 235/487; 327/536
(58) Field of Search ........................... 340/10.01, 10.03, 340/10.04, 10.34, 10.32; 235/375, 383, 385, 422, 487; 327/148, 157, 536

(56) References Cited

U.S. PATENT DOCUMENTS

| | | | | |
|---|---|---|---|---|
| 5,387,900 A | * | 2/1995 | Plonsky et al. | 340/551 |
| 5,546,031 A | * | 8/1996 | Seesink | 327/155 |
| 5,649,965 A | * | 7/1997 | Pons et al. | 607/2 |
| 5,670,772 A | * | 9/1997 | Goto | 73/718 |
| 5,682,032 A | * | 10/1997 | Philipp | 235/422 |
| 5,798,968 A | * | 8/1998 | Lee et al. | 365/185.11 |
| 5,847,662 A | * | 12/1998 | Yokota et al. | 340/10.31 |

OTHER PUBLICATIONS

IEEE 1997 International Solid–State Circuit Conference, "A Low–Power CMOS Integrated Circuit for Field–Powered Radio Frequency Identification Tags", D. Friedman et al, pp. 294–295.

* cited by examiner

Primary Examiner—Brian Zimmerman
Assistant Examiner—Clara Yang
(74) Attorney, Agent, or Firm—Mattingly, Stanger & Malur, P.C.

(57) ABSTRACT

A contactless IC card having an antenna, a transmit/receive circuit for recovering data (clock) and electric power from a carrier signal received by the antenna, a logic circuit operated with the electric power supplied thereto from the transmit/receive circuit, and a memory. The transmit/receive circuit has a rectifier circuit for outputting data (clock) and rectifier circuits for electric power in such a manner that the carrier signal is inputted to each of the rectifier circuit for outputting data (clock) and the rectifier circuit for electric power. With this configuration, high frequency matching can be optimized separately for the rectifier circuit for outputting data (clock) and the rectifier circuit for electric power. It is also possible to separately optimize adjustments to a voltage of recovered data (clock) and a recovered supply voltage.

3 Claims, 2 Drawing Sheets

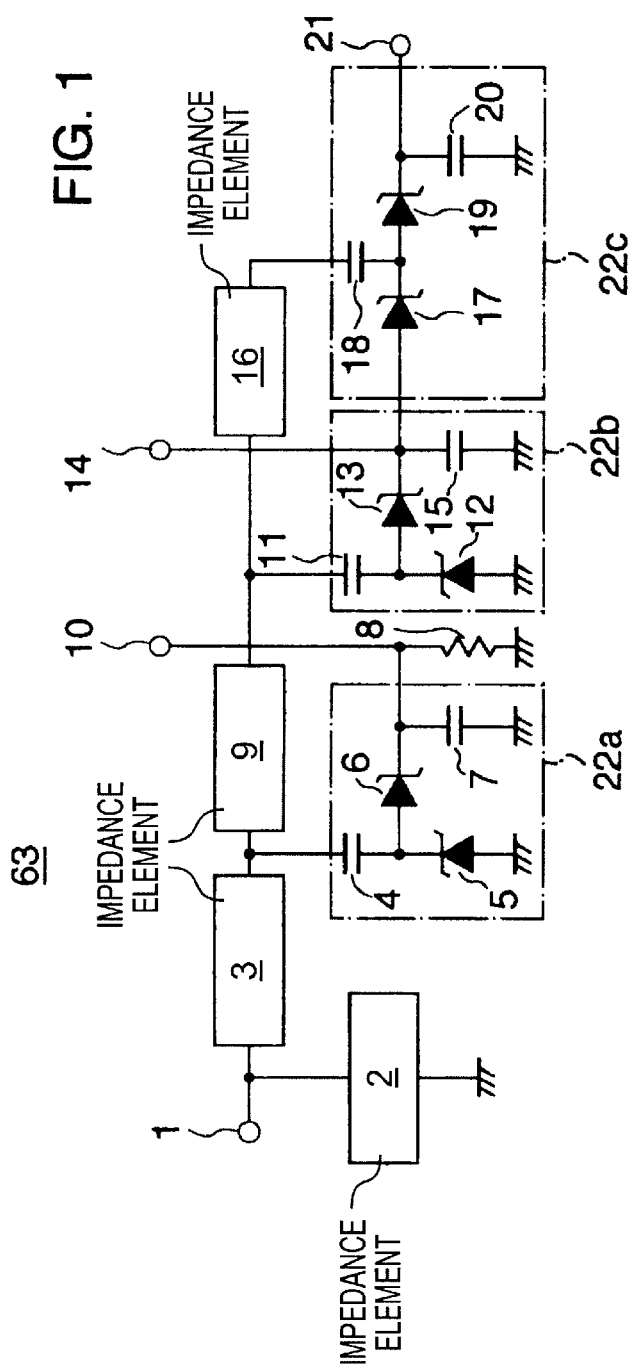
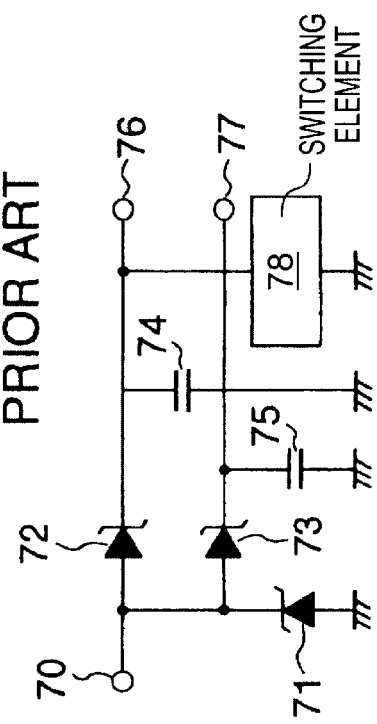

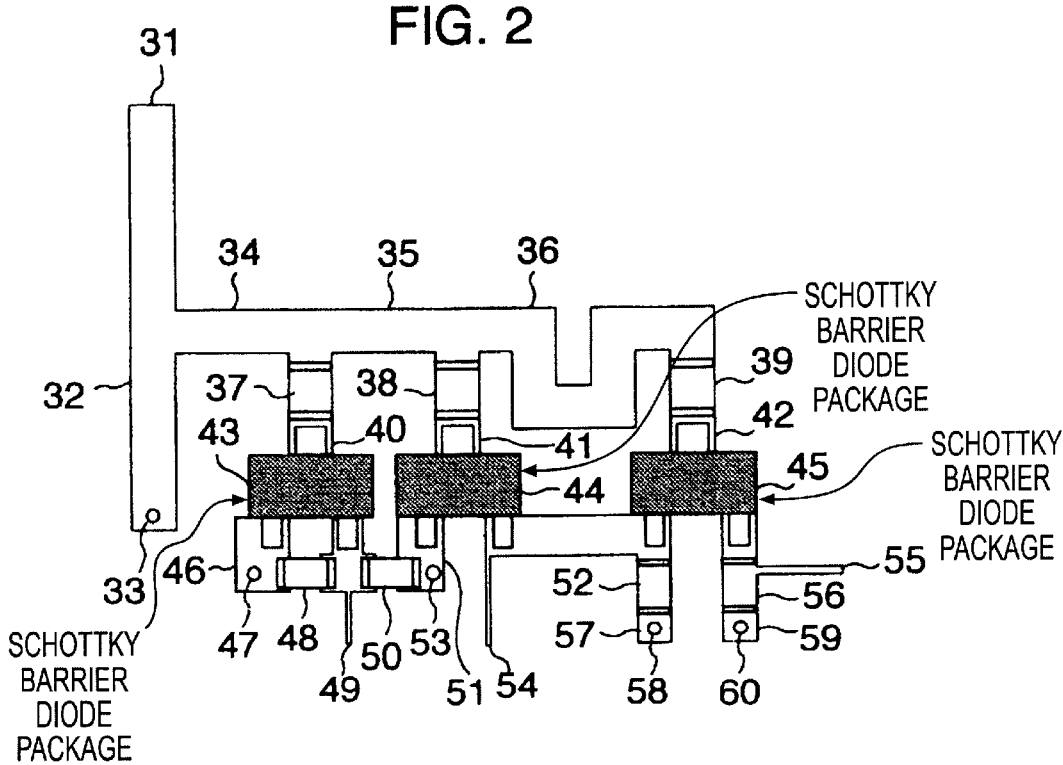
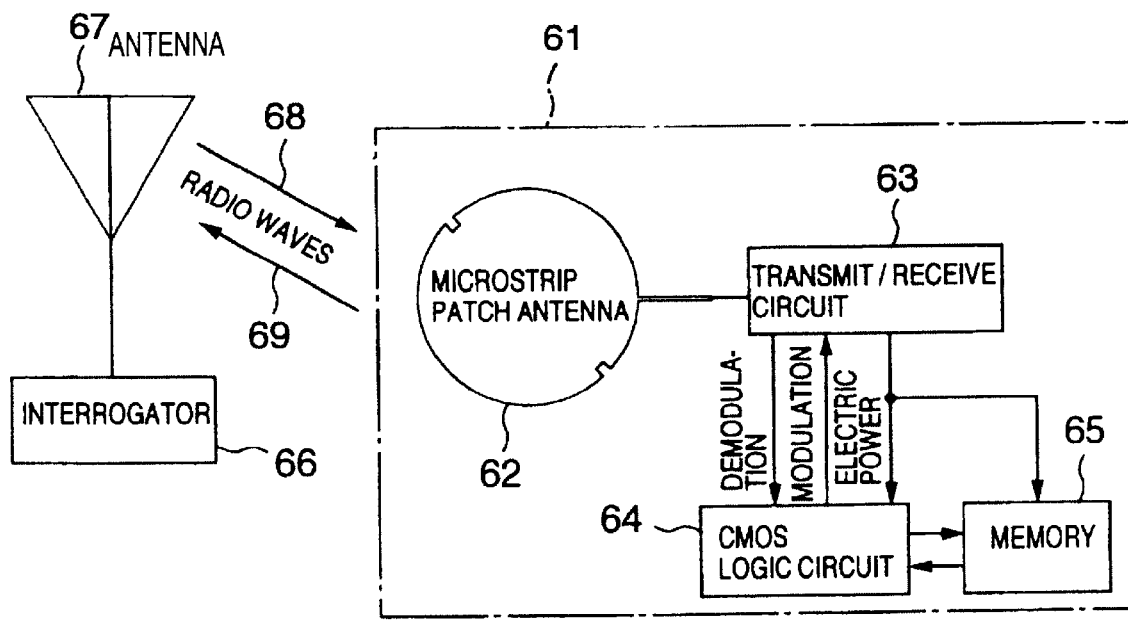

CONTACTLESS IC CARD

BACKGROUND OF THE INVENTION

The present invention relates to a contactless IC card which does not have a power supply, battery, or sources of signals such as a clock and a carrier. More particularly, the present invention relates to a contactless IC card which is characterized by a transmit/receive circuit adapted to recover a clock for operating signal processing circuits (such as logical circuits, memory, and so on), data, and electric power from a high frequency signal derived from an antenna or a coil arranged on the IC card, and to transmit a portion of data stored in the memory in accordance with the received data through the antenna or the coil as transmission data.

In "A Low-Power CMOS Integrated Circuit for Field-Powered Radio Frequency Identification Tags" by D. Friedman et al. published in 1997 IEEE ISSCC (International Solid-State Circuit Conference) p.294 and 295, SESSION 17/TD: LOW-POWER/LOW-VOLTAGE CIRCUITS/ PAPER SA17.5, a RFID (Radio Frequency Identification) tag using a high frequency signal is described. This RFID tag is a passive tag which operates as follows. Upon reception, the tag recovers data and electric power from a 100% AM-modulated RF (Radio Frequency) signal from an antenna through a circuit composed of a Schottky diode (or a Schottky barrier diode) and a capacitor. Upon transmission, the tag changes the impedance of a circuit including the Schottky diode, the capacitor and the antenna to transmit data. Such a passive tag is advantageously manufactured at a low price and in a compact configuration.

FIG. 4 illustrates the configuration of a transmit/receive circuit for recovering electric power and data in the prior art.
(Data Reception and Power Recovery)

A first diode 71 connected between an antenna terminal 70 and the ground and having its anode terminal grounded, has its cathode terminal connected to anode terminals of second and third diodes 73, 72 in parallel. Data and electric power are recovered from an output terminal 76 and a power terminal 77, respectively, through capacitors 75, 74 arranged between cathode terminals of the associated diodes 73, 72 and the ground.
(Data Transmission)

Data is transmitted by opening or closing a switching element 78 arranged at the cathode terminal of the third diode 72 to change a load impedance of an antenna.

In the transmit/receive circuit of FIG. 4, the diodes 71, 72, 73 are mainly responsible for detection and rectification, and the capacitors 74, 75 for accumulation of charge.

The conventional transmit/receive circuit has the second diode 73 for power recovery and the third diode 72 for data recovery connected in parallel to the cathode of the first diode 71, so that a voltage detected and rectified by the first diode 71 is supplied commonly to the output terminal 76 and the power terminal 77. With this configuration, a supply voltage outputted from the power terminal 77 is likely to exceed a data (clock) signal voltage outputted from the output terminal 76, depending on the magnitude of a load connected to the power terminal 77. In such a case, a logical circuit, which receives the supply voltage and data signal from the transmit/receive circuit, is highly susceptible to destruction.

In addition, when the switching element 78 is operated for data transmission, the power diode 73 is largely affected by a change in impedance, which would result in failing to recover a stable supply voltage.

SUMMARY OF THE INVENTION

The present invention is intended to individually optimize a rectifier circuit for data and clock and a rectifier circuit for electric power to facilitate adjustments of data, clock voltage, and supply voltage. For this purpose, a contactless IC card of the present invention comprises a transmit/receive circuit having a first rectifier circuit for outputting data and clock and a second rectifier circuit for outputting electric power, wherein the first rectifier circuit and the second rectifier circuit are provided with a carrier signal received by an antenna of the IC card.

These and other objects, features and advantages of the present invention will become more apparent in view of the following detailed description of the preferred embodiments in conjunction with accompanying drawings.

BRIEF DESCRIPTION OF THE DRAWINGS

FIG. 1 is a block diagram illustrating a transmit/receive circuit for a contactless IC card or a tag of the present invention;

FIG. 2 illustrates the circuit of FIG. 1 in the form of a surface mount pattern formed of microstrip lines;

FIG. 3 is an explanatory diagram for the operation of an IC card system; and

FIG. 4 is a block diagram illustrating a prior art transmit/receive circuit.

DESCRIPTION OF THE PREFERRED EMBODIMENTS

The configuration of a contactless IC card (tag) according to the present invention is illustrated in FIG. 3.

An interrogator 66 irradiates an IC card 61 with a downlink signal 68 modulated by a high frequency carrier signal such as microwaves. A microstrip patch antenna 62 has a resonant frequency equal to the carrier frequency. The antenna 62 may be implemented by a dipole antenna, a winding, or a printed coil, depending on the carrier frequency. A carrier signal received by the antenna 62 is inputted to a transmit/receive circuit 63 which demodulates a signal modulated on the carrier signal and recovers supply power from the same. The supply power is supplied to a CMOS logic circuit 64 and a memory 65. The CMOS logic circuit 64 controls the memory 65 to read data from and write data into the memory 65.

When data stored in the memory 65 is transmitted to the interrogator 66, the impedance of the transmit/receive circuit 63 is changed in accordance with a data signal. The interrogator 66 identifies this change in impedance as a change in signal power (uplink signal 69) through the antenna 62 and an antenna 67.

FIG. 1 illustrates an embodiment of the transmit/receive circuit 63 according to the present invention. The transmit/receive circuit 63 comprises an antenna terminal 1 to which a carrier signal is inputted; an output terminal 10 for outputting a clock and data; an input terminal 14 for delivering data; and a power terminal 21 for supplying electric power to the logical circuit 64 and the memory 65.

A carrier signal inputted through the antenna terminal 1 has its input voltage pumped in accordance with the ratio of an impedance value of an impedance element 2 having one end connected to a ground to an impedance value stepped up by impedance elements 3, 9, 16. In addition, the carrier signal is subjected to high frequency matching (impedance matching). The pumped voltage is applied to flying capacitors 4, 11, 18 of respective rectifier circuits 22a, 22b, 22c. When the carrier signal is very weak to provide a small input voltage, such boosting is effective in prompting the conduction of diodes in each rectifier circuit 22. Each impedance element may be composed of a microstrip line and an inductor.

A circuit composed of the flying capacitor 4, the Schottky barrier diodes 5, 6, and a capacitor 7, which is referred to as a charge pump circuit, is used in a switching regulator power supply, a charge pump circuit, and so on. A first charge pump circuit 22a is connected to the output terminal 10, and signals including data and a clock are supplied to the logic circuit 64. A signal outputted from the output terminal 10 is waveform-shaped in accordance with a time constant determined by the capacitor 7 and a resistor 8. The logic circuit 64 separates a clock and data from the output signal from the output terminal 10 to recover them. The charge pump circuit may also be implemented by any switching elements (for example, FET) other than the diodes.

A second (third) charge pump circuit 22b (22c) composed of a flying capacitor 11 (18), Schottky barrier diodes 12, 13 (17, 19), and a capacitor 15 (20) is a circuit for generating electric power for driving the logic circuit 64 and the memory 65. A signal pumped and rectified by the second charge pump circuit 22b is further pumped by the third charge pump circuit 22c, and outputted from the power terminal 21. As the number of stages for connecting charge pump circuits is increased, a higher supply voltage can be provided.

The transmit/receive circuit forms a resonant system which operates in resonance with the carrier signal inputted from the antenna terminal 1. In the circuit of FIG. 1, a switching circuit (not shown) connected to the input terminal 14 controls a charge/discharge state of charge accumulated on the capacitor 15 of the second charge pump circuit 22b. The IC card 61 changes the impedance of the transmit/receive circuit, viewed from the interrogator 66, to transmit a data signal to the interrogator 66. The passive tag (IC card) changes the impedance of the circuit while receiving the carrier signal from the interrogator 66, thereby transmitting a data signal. When the input terminal 14 is positioned between the stages of the charge pump circuits for generating a supply voltage as the circuit of FIG. 1, the influence of the data signal transmission on the recovery of a data (clock) signal and supply power can be suppressed to a minimum. Even if the capacitor 15 is in a discharge state, the impedance of the transmit/receive circuit may be set to recover a sufficient supply voltage to drive the logic circuit 64 and the memory 65.

In the transmit/receive circuit of the present invention, electric power supplied to each flying capacitor can be set by varying the impedance value of an associated impedance element. This permits a design for providing larger supply power, a design for increasing the output voltage of data (clock), or a design which lays emphasis on the modulation for transmission. Also, the transmit/receive circuit of the present invention provides a high degree of freedom with respect to the matching of the characteristic impedance of the antenna terminal 1 with the impedance of the antenna.

FIG. 2 illustrates an example of the transmit/receive circuit of FIG. 1 implemented by utilizing microstrip lines and a surface mount parts. The illustrated transmit/receive circuit comprises a input line 31 (1) for carrier signal; a microstrip line 32 (2) having one end connected to a ground plane on the lower surface through a throughhole 33; microstrip lines 34 (3), 35 (9), 36 (16); surface mountable flying capacitors 37 (4), 38 (11), 39 (18); surface mountable chip capacitors 48 (7), 52 (15), 56 (20); lands 40, 41, 42 of a microstrip structure for surface mounting various parts; surface mount packages 43 (5, 6), 44 (12, 13), 45 (17, 19) having a configuration of serially connected Schottky barrier diodes; surface mount land patterns 46, 51, 57, 59 for grounding; throughholes 47, 53, 58, 60 for grounding; a data (clock) output line 49 (10); a modulated signal input line 54 (14); a power output line 55 (21); and a surface mount chip resistor 50 (8). The reference numerals in parenthesis indicate corresponding elements in FIG. 1. Coefficients of the respective lines are set such that the transmit/receive circuit is tuned to a carrier signal from the input line 31.

The Schottky barrier diodes 43, 44, 45 may be simultaneously integrated together with the capacitors 37, 38, 39, 48, 52, 56, and the resistor 50 when the CMOS logic circuit 64 is formed into an integrated circuit. If the detection and rectification performance of the Schottky barrier diodes is preferentially considered, the Schottky barrier diodes may be formed into one chip after they have been fabricated in a different step from the CMOS logic circuit 64. Alternatively, the CMOS logic circuit, the capacitors and the resistor may be formed into one chip, while a packaged product may be used for the Schottky barrier diodes.

In the transmit/receive circuit of the present invention for a contactless IC card or a tag, the impedance matching in high frequency range can be optimized individually for a plurality of charge pump circuits. Since voltages applied to the respective charge pump circuits can be individually optimized by stepping up the impedance, optimized operations can be readily provided for the demodulation of clock and data, the recovery of detected and rectified electric power, the modulation upon transmission, and so on. For example, it is readily possible to set an amplitude value of data (clock) so as not to exceed a supply voltage value. This feature is particularly preferred when a carrier signal in a microwave zone is used, where a transmit/receive circuit may be formed of microstrip lines.

The circuit of FIG. 2 was actually fabricated using the flying capacitors 37, 38, 39 of 10 pF, the capacitor 48 of 1 pF, the resistor 50 of 12 kΩ, the capacitor 52 of 10 pF, and the capacitor 56 of 220 pF, and the operation of the circuit was confirmed.

A 200-kHz ASK-modulated signal on a carrier frequency at 2.45 GHz was used as a signal from the input line 31 for carrier signal. The data output line 49, the modulated signal input line 54 and the power output line 55 are respectively connected to the CMOS logic circuit, and the amplitude values of the clock and data, the supply voltage value, and a reflection coefficient of the input signal line to the modulation upon transmission were measured with the magnitude of an input signal set at −3 dBm in a 50 Ohm system. As a result, 1 to 1.5 volts was measured as the amplitude value of the data (clock), and a voltage ranging from 2 to 3 volts was generated as the supply voltage. For the modulation upon transmission, when a switching circuit formed of CMOS transistors was used to control charge/discharge of the capacitor 52, the reflection coefficient at the carrier signal input terminal was confirmed to be −15 dB during charging, and −5 dB during discharging.

While the present invention has been described above in conjunction with the preferred embodiments, one of ordinary skill in the art would be enabled by this disclosure to make various modifications to this embodiment and still be within the scope and spirit of the invention as defined in the appended claims.

What is claimed is:

1. A contactless IC card comprising:

an antenna;

a transmit/receive circuit for recovering a data signal and electric power from a carrier signal received by said antenna;

a logic circuit operated with said electric power supplied thereto from said transmit/receive circuit; and a memory, wherein said transmit/receive circuit includes a plurality of impedance elements and a plurality of charge pump circuits;

said plurality of impedance elements include a first impedance element having one end connected to a ground, a second impedance element having one end connected to the other end of said first impedance element, a third impedance element having one end connected to the other end of said second impedance element, and a fourth impedance element having one end connected to the other end of said third impedance element, said first impedance element having the other end connected to an input terminal of said carrier signal;

each said charge pump circuit includes a first diode, a second diode, a flying capacitor having one end connected to a first electrode of said first diode and to a second electrode of said second diode, and a capacitor arranged between a first electrode of said second diode and the ground;

a first charge pump circuit which comprises said first diode having a second electrode connected to the ground, said flying capacitor having the other end connected to the other end of said second impedance element, and said second diode having the first electrode thereof connected to an output terminal of said data signal;

a second charge pump circuit which comprises said first diode having the second electrode thereof connected to the ground, and said flying capacitor having the other end connected to the other end of said third impedance element; and a third charge pump circuit which comprises said first diode having the second electrode thereof connected to the first electrode of said second diode of said second charge pump circuit, said flying capacitor having the other end connected to the other end of said fourth impedance element, and said second diode having the first electrode thereof connected to an output terminal of said electric power.

2. A contactless IC card according to claim 1, further comprising:

a resistor having one end connected to the first electrode of said second diode of said first charge pump circuit, and the other end connected to the ground.

3. A contactless IC card according to claim 1, further comprising:

an input terminal for transmission of data connected to the first electrode of said second diode of said second charge pump circuit.

* * * * *